United States Patent
Namikawa

(10) Patent No.: US 7,934,722 B2
(45) Date of Patent: May 3, 2011

(54) IMAGE SCANNING APPARATUS AND IMAGE SCANNING METHOD

(75) Inventor: Hirofumi Namikawa, Kyoto (JP)

(73) Assignee: Murata Machinery, Ltd., Kyoto-shi (JP)

( * ) Notice: Subject to any disclaimer, the term of this patent is extended or adjusted under 35 U.S.C. 154(b) by 272 days.

(21) Appl. No.: 12/332,552

(22) Filed: Dec. 11, 2008

(65) Prior Publication Data

US 2009/0166961 A1    Jul. 2, 2009

(30) Foreign Application Priority Data

Dec. 28, 2007    (JP) .................................. 2007-340726

(51) Int. Cl.
*B65H 7/02*    (2006.01)

(52) U.S. Cl. .................... 271/265.04; 271/262; 271/263; 271/270; 271/265.01; 271/258.01

(58) Field of Classification Search .................. 271/262, 271/265.04, 265.01, 258.01, 263, 270
See application file for complete search history.

(56) References Cited

U.S. PATENT DOCUMENTS

| | | | |
|---|---|---|---|
| 6,511,064 B1 * | 1/2003 | Phinney et al. | 271/262 |
| 6,588,740 B2 * | 7/2003 | Brugger et al. | 271/10.03 |
| 7,172,195 B2 * | 2/2007 | Sano et al. | 271/262 |
| 2005/0081634 A1 * | 4/2005 | Matsuzawa | 73/579 |
| 2008/0088084 A1 * | 4/2008 | Shimazaki | 271/262 |

FOREIGN PATENT DOCUMENTS

| | | |
|---|---|---|
| JP | 1-156784 A | 6/1989 |
| JP | 7-237787 A | 9/1995 |
| JP | 7-257782 A | 10/1995 |
| JP | 10-171192 A | 6/1998 |
| JP | 2004-4181 A | 1/2004 |
| JP | 2004-026349 A | 1/2004 |
| JP | 2004-107030 A | 4/2004 |
| JP | 2006-44906 A | 2/2006 |
| JP | 2007-169044 A | 7/2007 |
| JP | 2007-230687 A | 9/2007 |

OTHER PUBLICATIONS

Japanese Office Action dated Oct. 27, 2009, issued in corresponding Japanese Patent Application No. 2007-340726.

* cited by examiner

*Primary Examiner* — Stefanos Karmis
*Assistant Examiner* — Ernesto Suarez
(74) *Attorney, Agent, or Firm* — Westerman, Hattori, Daniels & Adrian, LLP

(57) ABSTRACT

An image scanning apparatus includes a paper thickness detection unit arranged to detect a paper thickness of an original document based on a reception signal, and a multiple-feeding detection unit arranged to detect, based on the reception signal, whether or not the original document that is being transported has been multiply fed. Based on a detection result obtained by the paper thickness detection unit and the multiple-feeding detection unit, the transportation speed is adjusted.

18 Claims, 5 Drawing Sheets

IMAGE SCANNING APPARATUS AND IMAGE SCANNING METHOD

CROSS-REFERENCE TO RELATED APPLICATIONS

This application claims priority under 35 U.S.C. 119 to Japanese Patent Application No. 2007-340726, filed on Dec. 28, 2007, which application is hereby incorporated by reference in its entirety.

BACKGROUND

1. Field

The present invention relates to an image scanning apparatus and, more specifically, to improvement in an image scanning apparatus arranged to optically scan an original document transported from a containing unit.

2. Description of the Related Art

A technique for detecting, by using an ultrasonic sensor arranged to transmit ultrasonic sound towards an original document that is being transported, whether or not the original document that is being transported has been multiply fed, is being suggested. In such an image forming apparatus, by comparing a reception level of the ultrasonic sound that has passed through the original document with a threshold value, it is detected whether the original document that is being transported is in the singular or in the plural, i.e., whether or not the original document that is being transported has been multiply fed. Normally, when it is determined that the original document that is being transported has been multiply fed, the transportation of the original document is paused. In another apparatus, when multiple feeding is detected, a transportation speed is reduced in paper feeding of a next original document.

In such conventional apparatuses described above, when it is determined that the original document that is being transported has been multiply fed, the transportation of the original document is merely paused, or the transportation speed in the paper feeding of the next original document is merely reduced. Accordingly, a problem is that when it is determined that the original document that is being transported has not been multiply fed, paper jam or the like cannot be prevented from occurring in a transportation path.

SUMMARY

In order to overcome the problems described above, embodiments of the present invention provide an image scanning apparatus that can prevent occurrences of paper jam and multiple feeding. In particular, the embodiments of the present invention provide an image scanning apparatus that can prevent paper jam from occurring in a transportation path when it is determined that an original document that is being transported has not been multiply fed.

The problems to be solved by the embodiments of the present invention have been described. Next, methods for solving the problems, and advantages thereof will be described.

An image scanning apparatus according to an embodiment of the present invention includes a containing unit, an original document scanning unit, an ultrasonic sensor, and a transportation speed adjusting unit. At least two sheets of original documents can be contained in the containing unit. The original document scanning unit optically scans the original document transported from the containing unit. The ultrasonic sensor includes a transmission unit arranged to transmit ultrasonic sound towards the original document that is being transported from the containing unit to the original document scanning unit, and a reception unit arranged to receive the ultrasonic sound that has passed through the original document that is being transported. The transportation speed adjusting unit adjusts a transportation speed of the original document based on a reception signal sent from the reception unit. The transportation speed adjusting unit includes a paper thickness detection unit and a multiple-feeding detection unit. The paper thickness detection unit detects a paper thickness of the original document based on the reception signal. The multiple-feeding detection unit detects, based on the reception signal, whether or not the original document that is being transported has been multiply fed. The transportation speed adjusting unit adjusts the transportation speed based on a detection result obtained by the paper thickness detection unit and the multiple-feeding detection unit.

In the image scanning apparatus, the transportation speed of the original document is adjusted based on the reception signal sent from the ultrasonic sensor that transmits the ultrasonic sound towards the original document that is being transported from the containing unit to the original document scanning unit. At this time, the transportation speed is adjusted based on the detection result obtained by the paper thickness detection unit, which detects the paper thickness of the original document based on the reception signal, and by the multiple-feeding detection unit, which detects, based on the reception signal, whether or not the original document that is being transported has been multiply fed. In the above-described configuration, when it is determined that the original document that is being transported has not been multiply fed, the transportation speed can be adjusted based on the detected paper thickness. Accordingly, paper jam can be prevented from occurring in a transportation path.

In the image scanning apparatus according to an embodiment of the present invention, in addition to the above-described configuration, the configuration may be modified such that the transportation speed adjusting unit stops the transportation of the original document when the original document that is being transported has been multiply fed, and changes, when the original document that is being transported has not been multiply fed, the transportation speed based on the paper thickness detected by the paper thickness detection unit.

In addition to the above-described configuration, in the image scanning apparatus according to an embodiment of the present invention, the configuration may be modified such that the transportation speed adjusting unit reduces, based on an operator's operation for resuming the original document scanning, the transportation speed to less than the speed used when multiple feeding is detected, and then resumes the transportation of the original document. In such a configuration, when it is determined that the original document that is being transported has been multiply fed, the transportation speed is reduced to less than the speed used when the multiple feeding is detected, and then the transportation is resumed. Accordingly, another multiple feeding that possibly occurs after the previous multiple feeding is detected can be prevented, and paper jam due to such multiple feeding can be reduced.

In the image scanning apparatus according to an embodiment of the present invention, when it is determined that the original document that is being transported has not been multiply fed, the transportation speed can be adjusted based on the detected paper thickness. Therefore, paper jam can be prevented from occurring in the transportation path. Moreover, when it is determined that the original document that is being transported has been multiply fed, the transportation speed is reduced to less than the speed used when the multiple feeding is detected, and then the transportation is resumed. Accordingly, another multiple feeding that possibly occurs after the previous multiple feeding is detected can be prevented, and paper jam due to such multiple feeding can be reduced.

Other features, elements, processes, steps, characteristics and advantages of the present invention will become more apparent from the following detailed description of embodiments of the present invention with reference to the attached drawings.

DETAILED DESCRIPTION OF PREFERRED EMBODIMENTS

Figure 1:
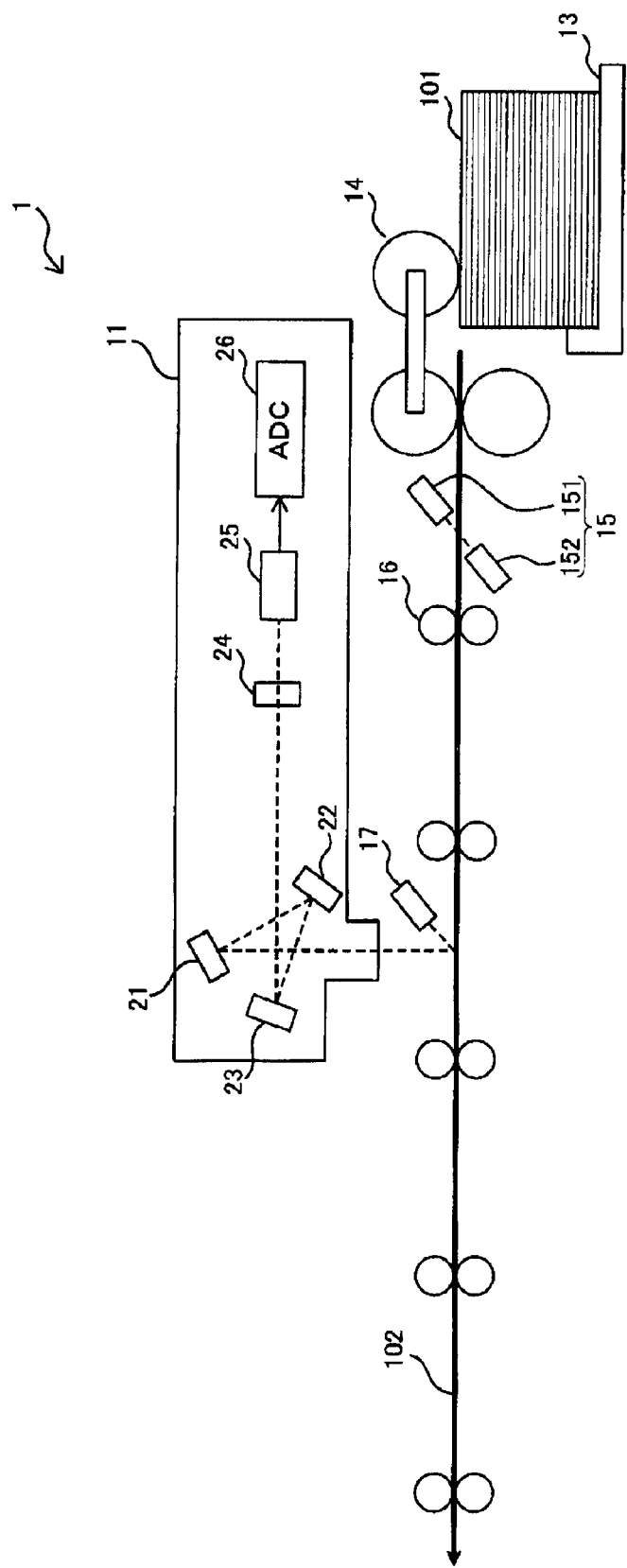
FIG. 1 illustrates an example of a schematic configuration of an image scanning apparatus according to an embodiment of the present invention.

FIG. 1 illustrates an example of a schematic configuration of an image scanning apparatus 1 according to an embodiment of the present invention. The image scanning apparatus 1 is a scanner arranged to optically scan an original document 101 and output image data. The image scanning apparatus 1 includes an original document scanning unit 11, a containing unit 13, an original document separation unit 14, an ultrasonic sensor 15, transportation rollers 16, and a light source unit 17.

The containing unit 13 is a tray or a cassette that is arranged to contain a plurality of original documents 101, and can be lifted up and down with the original documents 101 contained therein. The original document separation unit 14 is a paper feeding unit arranged to pick up the uppermost original document 101 from the original documents 101 contained in the containing unit 13 and to feed the picked-up document 101 to a transportation path 102. The transportation rollers 16 define a transportation unit arranged to transport the original document 101. A plurality of transportation rollers 16 are arranged along the transportation path 102 as a pair of rollers in order to nip the original document 101. The containing unit 13, the original document separation unit 14, and the transportation rollers 16 together define an Auto Document Feeder (ADF).

The original document scanning unit 11 is arranged to optically scan the original document 101 transported from the containing unit 13 and to generate image data, and includes mirrors 21 through 23, a lens 24, Charge Coupled Devices (CCD) 25, and an Analog Digital Converter (A/D converter) 26. The original document scanning unit 11 is disposed on an upper side of the transportation path 102, and arranged to linearly scan an upper side surface of the original document 101 that is being transported.

The mirrors 21 through 23 are an optical system arranged to reflect light that has been radiated from the light source unit 17, reflected from the original document 101, and has entered the original document scanning unit 11, and to let the light enter the lens 24. The CCD 25 is an image pickup device arranged to receive the light from the lens 24 and to generate detection signals in accordance with an amount of the received light. The ADC 26 is a conversion unit arranged to convert, into digital signals, analog signals sent from the CCD 25. In the above-described configuration, brightness data with respect to each pixel is output as the digital signals that correspond to an image of the original document 101.

In the above example, the light is radiated from the light source unit 17, and the light reflected from the upper side surface of the original document 101 enters the original document scanning unit 11.

The ultrasonic sensor 15 is a detection unit arranged to detect the original document 101, and includes a transmission unit 151 and a reception unit 152. The transmission unit 151 transmits ultrasonic sound towards the original document 101 that is being transported from the containing unit 13 to the original document scanning unit 11. The reception unit 152 receives the ultrasonic sound that has passed through the original document 101 that is being transported. The transmission unit 151 and the reception unit 152 are disposed facing each other across the transportation path 102. The reception unit 152 is disposed on a more downstream side of the transportation path 102 than the transmission unit 151.

The transmission unit 151 is a transmitter arranged to convert an electrical pulse signal into ultrasonic oscillation and then transmit the ultrasonic oscillation. The reception unit 152 is a receiver arranged to receive the ultrasonic sound from the transmission unit 151, convert the ultrasonic oscillation into an electrical signal, and then output the converted signal as a reception signal. The transmission unit 151 and the reception unit 152 are disposed such that the ultrasonic sound transmitted from the transmission unit 151 obliquely falls on the original document 101 that is being transported, so that the reflected sound will not interfere with the transmission unit 151.

The ultrasonic sound is transmitted from the transmission unit 151 at prescribed time intervals based on the transportation of the original document 101. For example, the ultrasonic sound of 200 kHz frequency is transmitted.

Figure 2:
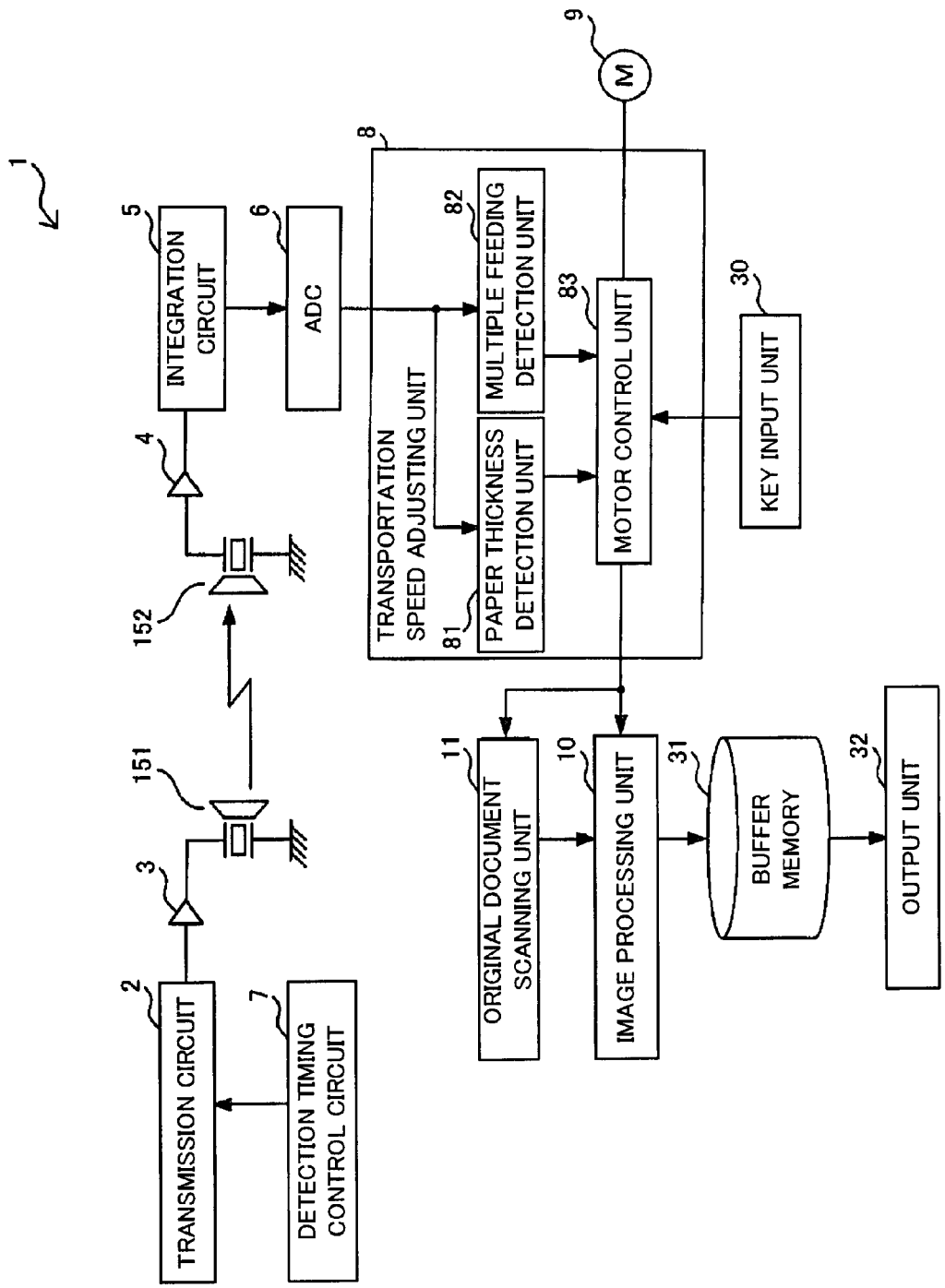
FIG. 2 is a block diagram illustrating a configuration example of the image scanning apparatus of FIG. 1, and an example of a functional configuration of the image scanning apparatus.

FIG. 2 is a block diagram illustrating a configuration example of the image scanning apparatus 1 of FIG. 1, and an example of a functional configuration of the image scanning apparatus 1. The image scanning apparatus 1 includes a transmission circuit 2, amplifiers 3, 4, an integration circuit 5, an Analog-to-Digital Converter (ADC) 6, a detection timing control circuit 7, a transportation speed adjusting unit 8, a transportation motor 9, an image processing unit 10, the original document scanning unit 11, a key input unit 30, a buffer memory 31, an output unit 32, the transmission unit 151, and the reception unit 152.

The transmission circuit 2 is arranged to generate electrical signals of prescribed frequency. The electrical signals generated in the transmission circuit 2 are electrically amplified by the amplifier 3, input into the transmission unit 151, and transmitted as the ultrasonic sound. The reception signals from the reception unit 152 are electrically amplified by the amplifier 4, and input into the integration circuit 5. The integration circuit 5 is arranged to smooth the reception signals, and then hold the reception signals at a prescribed timing.

The ADC 6 is a conversion circuit arranged to perform sampling on the held reception signals at prescribed time intervals in order to digitalize the signals, and to generate detection data that indicates a reception level of the ultrasonic sound. The detection timing control circuit 7 is arranged to output, to the transmission circuit 2, timing signals for transmitting the ultrasonic sound based on a paper feeding timing of the original document 101.

The image processing unit 10 is arranged to perform image processing on the image data transmitted from the original document scanning unit 11, and to store the processed image data in the buffer memory 31. In the image processing unit 10, a shading correction process and a gamma correction process are performed. In the shading correction process, distortion of the optical system in the original document scanning unit 11 is corrected. In the gamma correction process, the image data on which the shading correction has been performed is corrected in accordance with a prescribed conversion table.

The buffer memory 31 is a storage unit arranged to store, as output data, the image data transmitted from the image processing unit 10. The output unit 32 is arranged to read out the output data from the buffer memory 31, and to perform an output process in accordance with an operation mode. For example, an operation for transferring the output data to another terminal device is performed as an output process by using a facsimile function or a Local Area Network (LAN) transfer function.

The transportation speed adjusting unit 8 includes a paper thickness detection unit 81, a multiple-feeding detection unit 82, and a motor control unit 83. The transportation speed adjusting unit 8 is arranged to control the transportation motor 9 based on the reception signals sent from the reception unit 152, and to adjust a transportation speed of the original document 101.

The paper thickness detection unit 81 is a detection unit arranged to detect a paper thickness of the original document 101 based on the reception signals sent from the reception unit 152. In the paper thickness detection unit 81, a paper thickness of the original document that is being transported is detected based on the detection data sent from the ADC 6.

The multiple-feeding detection unit 82 is arranged to determine, based on the reception signals sent from the reception unit 152, whether or not the original document 101 that is being transported has been multiply fed. By the multiple-feeding detection unit 82, based on the detection data sent from the ADC 6, it is determined whether one sheet of original document 101 is being transported or a plurality of sheets of original documents 101 are being transported, i.e., it is determined whether or not the original document 101 has been multiply fed.

More specifically, by comparing the reception level of the ultrasonic sound with a threshold value "bp", it is determined, based on the comparison result, whether or not the original document 101 has been multiply fed. In other words, if the reception level is less than the threshold value "bp", it is determined that the original document 101 has been multiply fed. If the reception level is more than or equal to the threshold value "bp", it is determined that the original document 101 has not been multiply fed.

When it is detected by the multiple-feeding detection unit 82 that the original document 101 that is being transported has been multiply fed, the motor control unit 83 stops the transportation of the original document 101. When the original document 101 has not been multiply fed, the motor control unit 83 performs an operation for changing the transportation speed based on the paper thickness detected by the paper thickness detection unit 81. That is, when the reception level of the ultrasonic sound is more than or equal to the threshold value "bp", in the transportation speed adjusting unit 8, the transportation speed is changed based on the detected paper thickness. When the reception level is less than the threshold value "bp", it is determined that the original document 101 has been multiply fed, and the operation for stopping the transportation of the original document 101 is performed.

As an example of adjusting the transportation speed based on the paper thickness, it is assumed that, if the paper thickness is not within a normal (usual) range, the transportation speed is reduced to less than the transportation speed used when the paper thickness is within the normal range.

After the transportation is stopped in response to the multiple-feeding detection, different operations are performed, for example, depending on the number of multiple-feeding detections. More specifically, when the number of multiple-feeding detections is less than or equal to a predetermined set value "A", an operation for resuming the transportation is performed based on an operator's operation for resuming the scanning of the original document 101, i.e., based on a signal that is input from the key input unit 30. At the time of resuming the transportation, the transportation of the original document 101 is resumed at the transportation speed that is less than the speed used when the multiple feeding is detected.

On the other hand, when the number of multiple-feeding detections exceeds the set value "A", an operation for forcibly terminating a scanning job with respect to the original document 101 is performed.

In the original document scanning unit 11, based on a control signal from the motor control unit 83, an operation for determining a resolution used at the time of original document scanning is performed. In other words, an operation for adjusting the resolution is performed in accordance with the adjusted transportation speed. More specifically, the lower the transportation speed is, the more the resolution at which the original document 101 is scanned line by line increases. Alternatively, an operation for adjusting the scanning speed used at the time of original document scanning is performed in accordance with the adjusted transportation speed.

In the image processing unit 10, based on the control signal sent from the motor control unit 83, an operation for adjusting a parameter used for image processing is performed. In other words, the operation for adjusting the parameter is performed in accordance with the adjusted transportation speed. More specifically, an operation for adjusting an amount of gamma correction is performed in accordance with the transportation speed.

Figure 3:
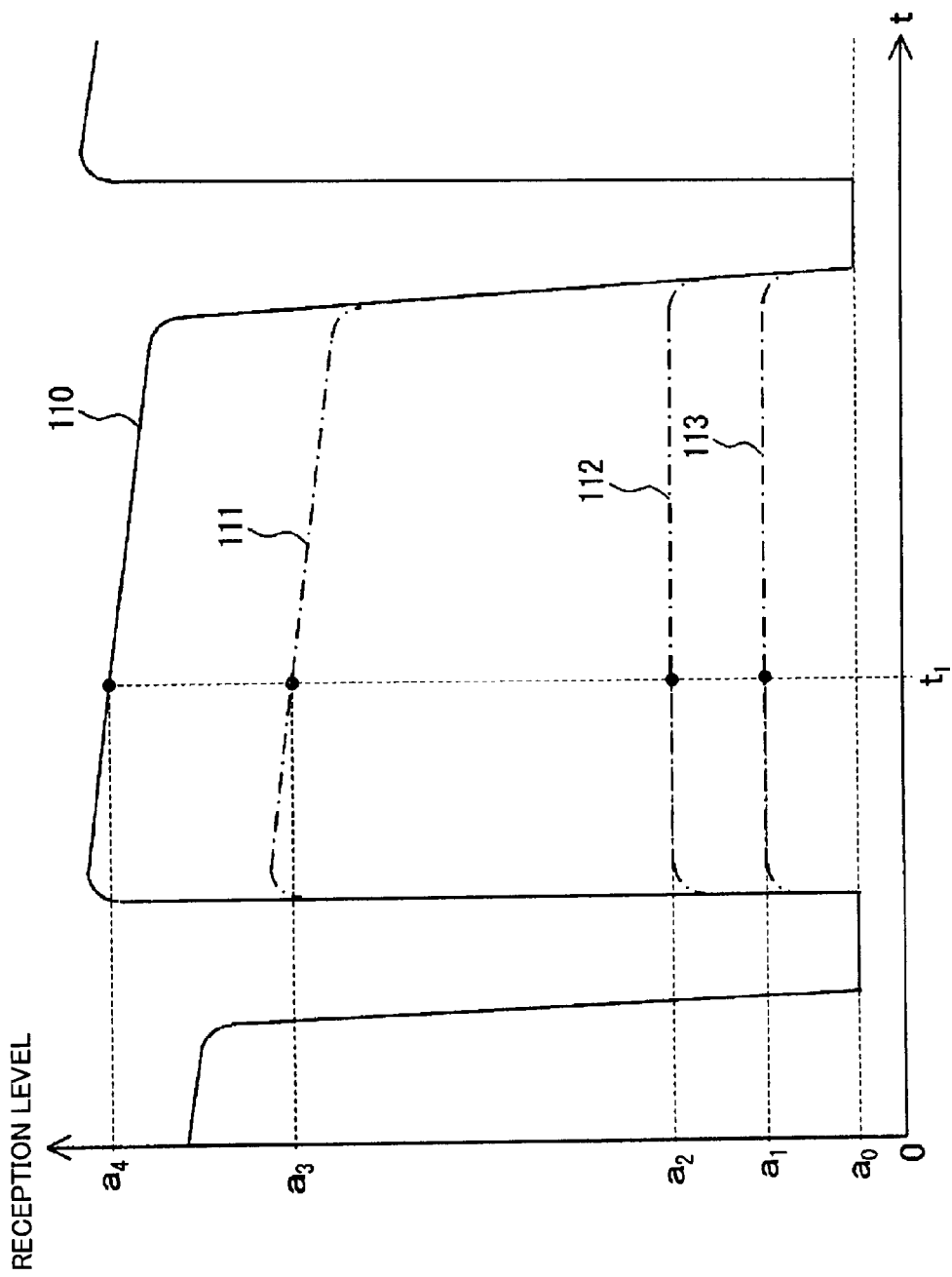
FIG. 3 illustrates an example of performance observed in the image scanning apparatus of FIG. 2, and illustrates curves representing reception levels of ultrasonic sound detected by using a reception unit of an ultrasonic sensor.

FIG. 3 illustrates an example of performance observed in the image scanning apparatus 1 of FIG. 2, and curves 110 through 113 representing the reception levels of the ultrasonic sound detected by the ADC 6. FIG. 3 represents changes in the reception level, as a graph of reception level (vertical axis) plotted as a function of time "t" (horizontal axis).

The curve 110 represents the reception level received when there is no original document 101 (the state will be referred to as a "no paper" state). The curves 111 through 113 represent the reception level received when the original document 101 is present. The curves 111 and 112 indicate different paper thicknesses. The curve 111 indicates a small paper thickness, and the curve 112 indicates a great paper thickness. The curve 113 represents the reception level received at the time of multiple feeding.

Each of the curves 110 through 113 indicates a minimum value (minimum value=reset level "a0") at the time of resetting the sample and hold. The reception signal is held at the timing of turning on a switch. Then, until the switch is turned off, the curves 110 and 111 gradually decrease due to condenser discharge, and the curves 112 and 113 go substantially sideways.

In the ADC 6, sampling is performed on the reception levels, which are represented by these curves 110 through 113, at prescribed time intervals, and then an operation for outputting the reception levels as the detection data is performed. In this example, the sampling is performed on the reception level at time "t1", and different reception levels "a1" through "a4" are detected depending on a state of the original document 101.

The reception level "a4" corresponds to the reception level received when there is no paper, and the reception level "a3" corresponds to the reception level received when the paper thickness is small (i.e., a3<a4). The reception level "a2" corresponds to the reception level received when the paper thickness is great, and the reception level "a1" corresponds to the reception level received at the time of multiple feeding (i.e., a0<a1<a2<a3).

Figure 4:
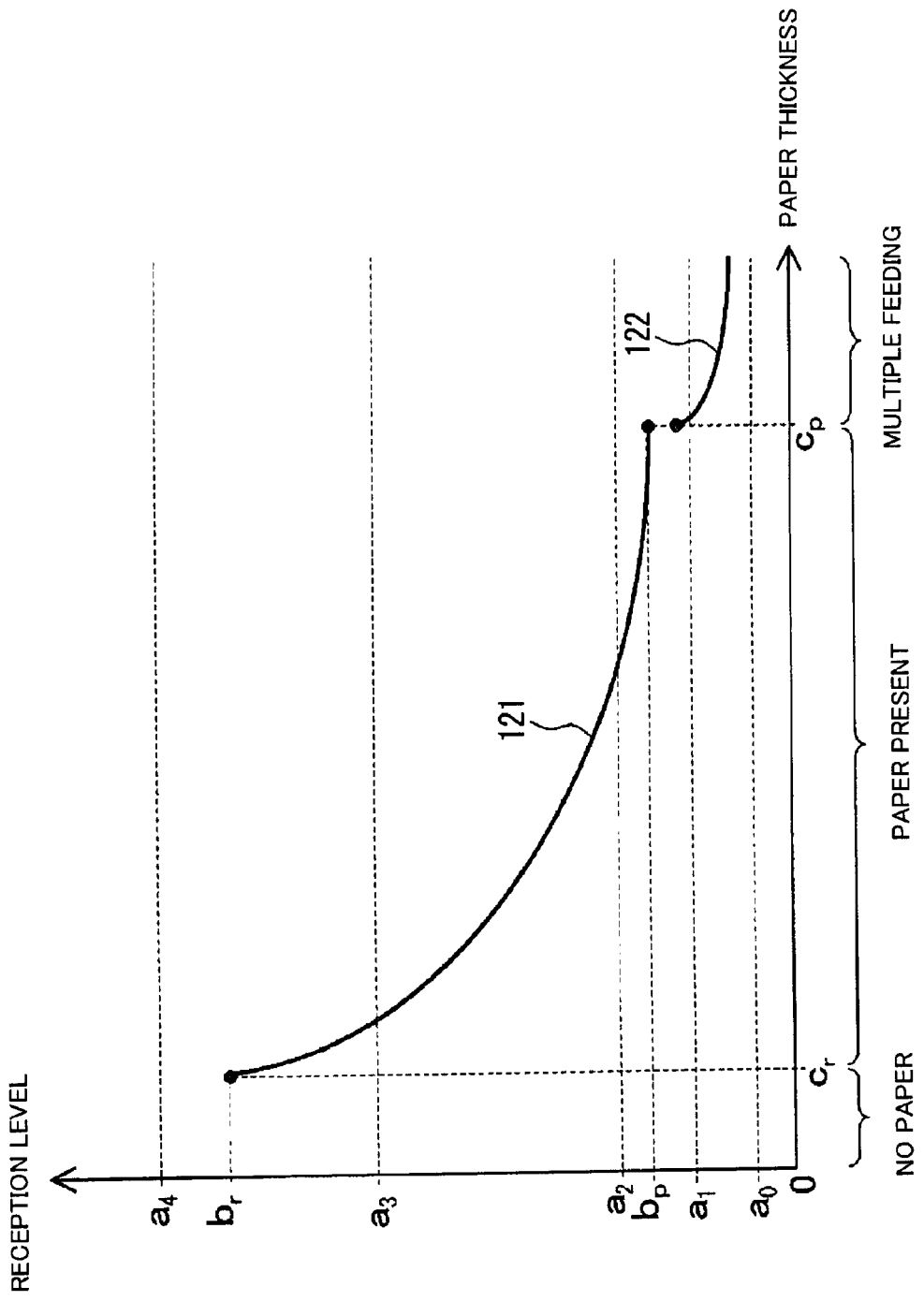
FIG. 4 illustrates an example of performance observed in the image scanning apparatus of FIG. 2, and illustrates a characteristic curve that represents a correspondence relation between a reception level of ultrasonic sound and a paper thickness, and a characteristic curve observed at the time of multiple feeding.

FIG. 4 illustrates an example of an operation performed in the image scanning apparatus 1 of FIG. 2, a characteristic curve 121, and a characteristic curve 122, which is observed at the time of multiple feeding. The characteristic curves 121 and 122 represent a correspondence relation between the reception level and the paper thickness as a graph of reception level (vertical axis) plotted as a function of paper thickness (horizontal axis).

The characteristic curve 121 represents a conversion table used to convert the reception level into the paper thickness when there is one sheet of original document 101. In the characteristic curve 121, the reception level monotonously decreases with an increase in the paper thickness. More specifically, the reception level "br" is shown at the lower limit "cr" of the paper thickness, and the reception level "bp" is shown at the upper limit "cp" of the paper thickness, where the reception level is saturated at the reception level "bp" (i.e., "bp<br"). The range in which the reception level exceeds the reception level "br" (i.e., the range from the point at the paper thickness "cr" to a left side thereof) indicates the "no paper state".

The characteristic curve 122 represents the correspondence relation between the reception level and the paper thickness observed when there are a plurality of sheets of original documents 101. In the characteristic curve 122, the reception level monotonously decreases with an increase in the paper thickness. More specifically, the reception level is smaller than the reception level "bp" at the upper limit "cp" of the paper thickness, and the reception level decreases in an area on a right side of the upper limit "cp" with an increase in the paper thickness. The reception level "bp" is the threshold value that is used for determining whether or not the original document 101 has been multiply fed.

When the reception level of the ultrasonic sound is equal to or less than the reception level "bp", an operation for determining that the original document 101 has been multiply fed is performed in the multiple-feeding detection unit 82. Generally, comparing a case in which two sheets of original documents having a small paper thickness are fed with a case in which one sheet of original document having a double thickness is fed, the reception level is smaller in the case of two sheets of original documents, due to the influence in layers of air between the documents. The multiple-feeding detection is performed by using such features observed in the reception level of the ultrasonic sound.

Figure 5:
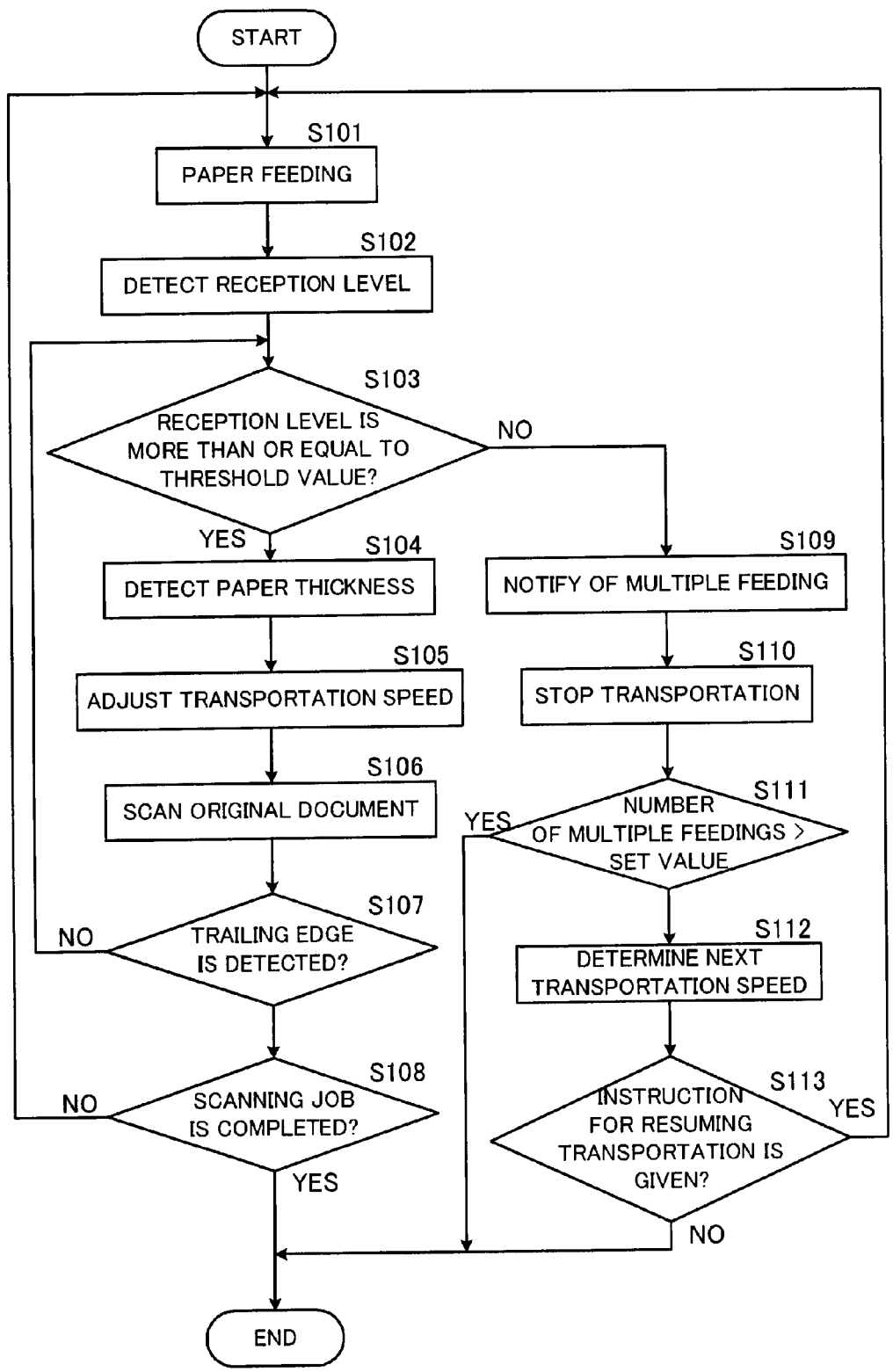
FIG. 5 is a flowchart of an example of an operation performed at the time of original document scanning in the image scanning apparatus of FIG. 2.

Steps S101 through S113 of FIG. 5 is a flowchart of an operation example performed at the time of original document scanning in the image scanning apparatus 1 of FIG. 1.

When the original document 101 is fed from the containing unit 13, the ADC 6 detects the reception level based on the reception signal sent from the ultrasonic sensor 15 (steps S101 and S102). Then, the transportation speed adjusting unit 8 refers to the reception level detected by the ADC 6 (step S103), and detects the paper thickness of the original document 101 when the reception level is more than or equal to the threshold value "bp" (step S104).

At this time, the transportation speed adjusting unit 8 adjusts the transportation speed of the original document 101 based on the detected paper thickness (step S105). Then, the original document scanning unit 11 generates image data by scanning the transported original document 101 (step S106). The processes in steps S103 through S106 are repeated until a trailing edge of the original document 101 is detected (step S107), and when the trailing edge is detected, the process proceeds to step S108.

In step S108, it is determined whether or not a series of scanning jobs instructed by the operator has been completed. When the series of scanning jobs is completed, the process is ended. When the series of scanning jobs is not completed, the processes in steps S101 through S107 are repeated until the scanning jobs are completed.

When the reception level is less than the threshold value "bp", the transportation speed adjusting unit 8 determines that the original document 101 has been multiply fed, outputs an error signal for indicating the multiple feeding (step S109), and stops the transportation of the original document 101 (step S110). The ultrasonic sensor 15 stops sending the ultrasonic sound based on the output of the error signal.

Then, the transportation speed adjusting unit 8 refers to the number of multiple-feeding detections (step S811), and when the number of detections exceeds the set value, the scanning job of the original document 101 is forcibly terminated. When the number of detections is less than or equal to the set value, the next transportation speed is determined. Then, when the operator instructs for resuming the original document scanning, the processes in steps S101 through S112 are repeated (step S113). When the operator does not instruct for resuming the original document scanning, the process is ended.

In the present embodiment, when it is determined that the original document 101 that is being transported has not been multiply fed, the transportation speed is adjusted based on the detected paper thickness. Therefore, paper jam can be prevented from occurring in the transportation path 102. Moreover, when it is determined that the original document 101 that is being transported has been multiply fed, the transportation speed is reduced to less than the speed used when the multiple feeding is detected, and then the transportation is resumed. Therefore, another multiple feeding can be prevented after the multiple-feeding detection, and the paper jam due to such multiple feeding can be reduced.

While the detailed description has been given above with respect to embodiments discussed, the present invention is not limited to these embodiments, and various modifications and variants, that fall within the true spirit and scope of the claimed invention, are possible.

What is claimed is:

1. An image scanning apparatus comprising:
   a containing unit arranged to contain at least two sheets of original documents;
   an original document separation unit arranged to transport the original document from the containing unit onto a transport path;
   a plurality of transportation rollers arranged to transport the original document along the transport path at a transportation speed;

a motor unit for driving the plurality of transportation rollers;

an original document scanning unit arranged to optically scan the original document transported from the containing unit;

an ultrasonic sensor including a transmission unit arranged to transmit ultrasonic sound towards the original document that is being transported from the containing unit to the original document scanning unit, and a reception unit arranged to receive the ultrasonic sound that has passed through the original document that is being transported; and a transportation speed adjusting unit arranged to adjust the transportation speed of the original document based on a reception signal sent from the reception unit, wherein the transportation speed adjusting unit includes:

a paper thickness detection unit arranged to detect a paper thickness of the original document based on the reception signal; and a multiple-feeding detection unit arranged to detect, based on the reception signal, whether or not the original document that is being transported has been multiply fed, and the transportation speed adjusting unit adjusts the transportation speed by controlling the motor unit based on a detection result obtained by the paper thickness detection unit and the multiple-feeding detection unit, wherein when the original document that is being transported has not been multiply fed, the transportation speed adjusting unit changes the transportation speed based on the paper thickness detected by the paper thickness detection unit.

2. The image scanning apparatus according to claim 1, wherein when the original document that is being transported has been multiply fed, the transportation speed adjusting unit stops the transportation of the original document.

3. The image scanning apparatus according to claim 1, wherein when the paper thickness is not within a normal range, the transportation speed is reduced to less than the transportation speed used when the paper thickness is within the normal range.

4. The image scanning apparatus according to claim 2, wherein, based on an operator's operation for resuming the original document scanning, the transportation speed adjusting unit reduces the transportation speed to less than the speed used when multiple feeding is detected, and then resumes the transportation of the original document.

5. The image scanning apparatus according to claim 4, wherein the transportation speed adjusting unit performs, based on the number of multiple-feeding detections, different operations after the transportation is stopped in response to the multiple-feeding detection.

6. The image scanning apparatus according to claim 5, wherein when the number of multiple-feeding detections is less than or equal to a predetermined set value, based on the operator's operation for resuming the original document scanning, the transportation speed adjusting unit reduces the transportation speed to less than the speed used when the multiple feeding is detected, and then resumes the transportation of the original document, and when the number of multiple-feeding detections exceeds the set value, the transportation speed adjusting unit performs an operation for forcibly terminating an original document scanning job.

7. The image scanning apparatus according to claim 1, wherein the multiple-feeding detection unit compares a level of the reception signal with a prescribed threshold value, and then determines, based on a comparison result, whether or not the original document has been multiply fed.

8. The image scanning apparatus according to claim 7, wherein when the level of the reception signal is less than the prescribed threshold value, the multiple-feeding detection unit determines that the original document has been multiply fed, and when the level of the reception signal is more than or equal to the prescribed threshold value, the multiple-feeding detection unit determines that the original document has not been multiply fed.

9. The image scanning apparatus according to claim 1, wherein the original document scanning unit adjusts, based on the adjusted transportation speed, a resolution used at the time of original document scanning.

10. The image scanning apparatus according to claim 1, wherein the original document scanning unit adjusts, based on the adjusted transportation speed, a scanning speed used at the time of original document scanning.

11. The image scanning apparatus according to claim 1, further comprising an image processing unit arranged to perform image processing on image data sent from the original document scanning unit, wherein the image processing unit adjusts, based on the adjusted transportation speed, a parameter used for the image processing.

12. An image scanning method using an image scanning apparatus including:

an original document scanning unit arranged to optically scan an original document transported from a containing unit, which is arranged to contain at least two sheets of original documents;

an original document separation unit arranged to transport the original document from the containing unit onto a transport path:, a plurality of transportation rollers arranged to transport the original document along the transport path at a transportation speed; and an ultrasonic sensor having a transmission unit arranged to transmit ultrasonic sound towards the original document that is being transported from the containing unit to the original document scanning unit, and a reception unit arranged to receive the ultrasonic sound that has passed through the original document that is being transported, wherein the image scanning method comprising the steps of:

detecting a paper thickness of the original document based on a reception signal sent from the reception unit;

detecting, based on the reception signal, whether or not the original document that is being transported has been multiply fed; and adjusting the transportation speed of the original document based on a detection result obtained in the paper thickness detecting step and the multiple-feeding detecting step, wherein in the transportation speed adjusting step, when the original document that is being transported has not been multiply fed, the transportation speed is changed to the speed that is based on the paper thickness detected in the paper thickness detecting step.

13. The image scanning method according to claim 12, wherein in the transportation speed adjusting step, when the original document that is being transported has been multiply fed, the transportation of the original document is stopped.

14. The image scanning method according to claim 13, wherein in the transportation speed adjusting step, based on an operator's operation for resuming the original document scanning, the transportation speed is reduced to less than the speed used when the multiple feeding is detected, and then, the transportation of the original document is resumed.

15. The image scanning method according to claim 14, wherein in the transportation speed adjusting step, based on the number of multiple-feeding detections, different operations are after the transportation is stopped in response to the multiple-feeding detection.

16. The image scanning method according to claim 12, further comprising the step of adjusting a resolution at the time of original document scanning based on the adjusted transportation speed.

17. The image scanning method according to claim 12, further comprising the step of adjusting a scanning speed at the time of original document scanning based on the adjusted transportation speed.

18. The image scanning method according to claim 12, further comprising the step of adjusting, based on the adjusted transportation speed, a parameter that is used for performing image processing on image data sent from the original document scanning unit.

* * * * *